United States Patent [19]
Shirato et al.

[11] 4,339,762
[45] Jul. 13, 1982

[54] LIQUID JET RECORDING METHOD

[75] Inventors: Yoshiaki Shirato, Yokohama; Yasushi Takatori, Sagamihara; Toshitami Hara, Tokyo; Yukuo Nishimura, Sagamihara; Michiko Takahashi, Tokyo, all of Japan

[73] Assignee: Canon Kabushiki Kaisha, Tokyo, Japan

[21] Appl. No.: 136,179

[22] Filed: Mar. 31, 1980

[30] Foreign Application Priority Data

Apr. 2, 1979 [JP] Japan .................................. 54-39529

[51] Int. Cl.³ ............................................ G01D 15/18
[52] U.S. Cl. .................................. 346/140 R; 346/1.1
[58] Field of Search ......................... 346/1.1, 140 PD

[56] References Cited
U.S. PATENT DOCUMENTS 4,251,824 2/1981 Hara et al. .................. 346/140 PD Primary Examiner—George H. Miller, Jr.
Attorney, Agent, or Firm—Fitzpatrick, Cella, Harper & Scinto

[57] ABSTRACT

A liquid jet recording method capable of recording gradation comprises (a) filling with a liquid a conduit having, at the end, an orifice for ejecting and projecting a liquid droplet to a predetermined direction, said conduit being provided with a heat actuating portion generating a force for ejecting the liquid droplet by applying heat energy to the liquid to cause an abrupt state change, the heat actuating portion including an electro-thermal transducer having a heat generating portion which has such a structure that the degree of heat supply is different from position to position on the heating surface, and (b) controlling the strength of an input electric signal corresponding to the gradation of an image to be recorded, thereby controlling the distribution of degree of heat supplying at the heating surface.

9 Claims, 18 Drawing Figures

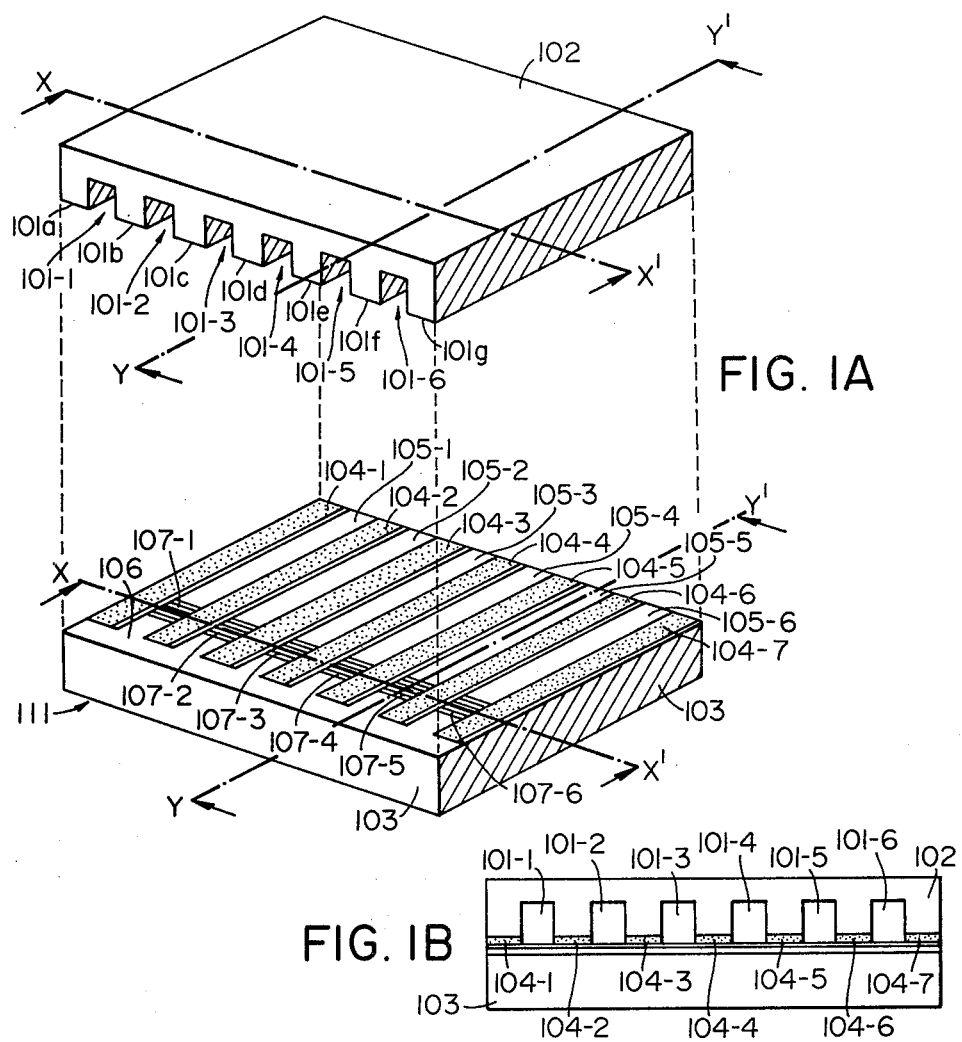
FIG. 1A
FIG. 1B
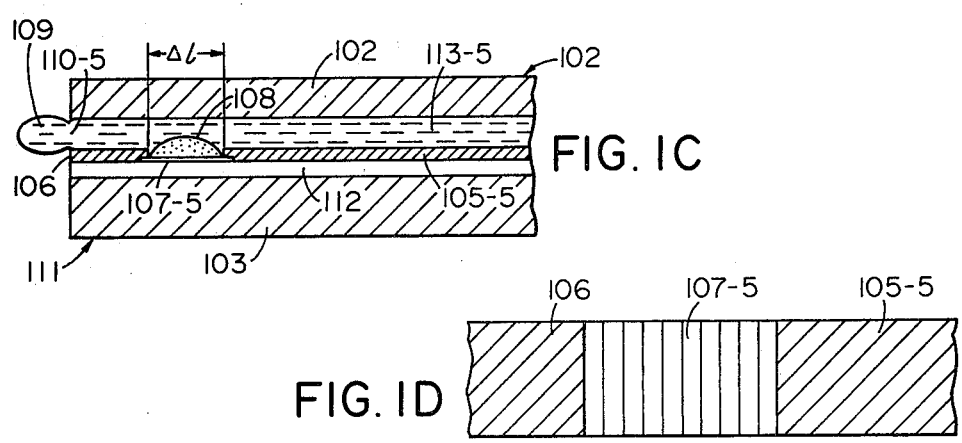
FIG. 1C
FIG. 1D

LIQUID JET RECORDING METHOD

BACKGROUND OF THE INVENTION

1. Field of the Invention

The present invention relates to an improvement in a liquid jet recording method comprising applying heat energy to a recording liquid filling a heat actuating portion communicated with an ejecting orifice, ejecting the liquid droplet and projecting it onto a record receiving member.

2. Description of the Prior Art

Non-impact recording methods are good recording methods since noise is minimal upon recording, high speed recording is possible and recording can be made on plain paper without any particular fixing treatment. Among them, the so-called ink jet recording method (liquid jet recording method) is a very powerful recording method, and there have been proposed various systems and improvements. Some are now commercially available while some are still under development.

U.S. Patent Application Ser. No. 948,236 filed Oct. 3, 1978 discloses a liquid jet recording method having a unique feature in that heat energy is applied to a liquid to obtain a driving force for ejecting a liquid droplet. That is, the above mentioned liquid jet recording method comprising causing a state change of a liquid accompanied by an abrupt increase in liquid volume by applying heat energy to the liquid, ejecting a liquid droplet from an orifice at the tip of a recording head by the actuating force due to the state change of the liquid and thereby projecting the liquid droplet onto a record receiving member.

This recording method can be effectively applied to the so-called drop-on-demand recording method, and further the recording head portion can be a full line type and can be easily constructed in a form of a high density multi-orifice system. Therefore, images of high resolution and high quality can be produced at a high speed.

However, despite such excellent features, the above mentioned method still requires improvement with respect to reproducibility of images having gradation and fidelity of such recorded images.

SUMMARY OF THE INVENTION

An object of the present invention is to provide an improvement in the above mentioned liquid jet recording method.

Another object of the present invention is to provide an improved liquid jet recording method capable of recording images having gradation with a high reproducibility.

A further object of the present invention is to provide a liquid jet recording method of a good response to a gradation signal and capable of reproducing the gradation of the original image with a high fidelity.

Still another object of the present invention is to provide a liquid jet recording method which is very effective when applied to a multi-orifice, in particular, a high density multi-orifice recording head.

According to the present invention, there is provided a liquid jet recording method capable of recording gradation which comprises: (a) filling with a liquid a conduit having, at the end, an orifice for ejecting and projecting a liquid droplet to a predetermined direction, said conduit being provided with a heat actuating portion generating a force for ejecting the liquid droplet by applying heat energy to the liquid to cause an abrupt state change, the heat actuating portion including an electrothermal transducer having a heat generating portion which has such a structure that the degree of heat supplying is different from position to position on the heating surface, and (b) controlling the strength of an input electric signal corresponding to the gradation of an image to be recorded, thereby controlling the distribution of the heat supply at the heating surface.

BRIEF DESCRIPTION OF THE DRAWINGS

FIGS. 1A–1D show a prior art recording head for understanding the difference between the prior art and the present invention, FIG. 1A is a diagrammatic perspective view of the prior art recording head in a disassembled state, FIG. 1B is a cross sectional view taken along a dot and dash line X—X' in FIG. 1A, FIG. 1C is a cross sectional view taken along a dot and dash line Y—Y' in FIG. 1A, and FIG. 1D is a diagrammatic plane view showing a plane pattern of a heat generating member at Δ 1 of a heat actuating portion;

DESCRIPTION OF THE PREFERRED EMBODIMENTS

Figure 2:
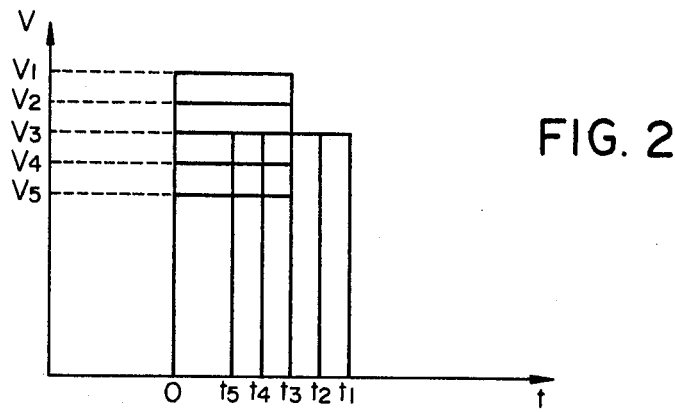
FIG. 2 is a graph showing various electric pulses applied to the heat generating member.

In FIGS. 1A–1D is shown a prior art recording head.

Referring to FIG. 1A, a lid member 111 comprises a substrate 103, six heat generating members 107 and electrodes for conducting electric current, that is, a common electrode 106 and six electrodes 105, overlying the substrate 103.

The lid member 111 is bonded to a grooved plate 102 by means of an adhesive layer 104 in such a way that heat generating members 107 correspond to grooves 101 of the grooved member 102. Ink is then introduced into a conduit 113 of the resulting recording head and the heat generating member 107 is energized to cause an abrupt state change of the liquid present on the heat generating member 107, and as a result, a bubble 108 forms instantly. This formation of a bubble and the growth of the bubble produce a force for ejecting a liquid droplet 109 through an orifice 110 formed by the grooved plate 102 and the lid member 111.

The six electrothermal transducers provided in the recording head of FIG. 1 have a cross sectional view as shown in FIG. 1C, that is, a heat accumulating layer 112 for controlling appropriately the amount of the generated heat, layer 117 being provided on the substrate 103, and on the heat accumulating layer 112 is provided a heat generating member 107-5, a common electrode 106 (common to 6 electrothermal transducers) and a selective electrode 105-5 for selecting the heat generating member 107-5 and energizing it to generate heat.

In FIG. 1C, the heat generating portion is composed of a heat generating member 107-5 only. However, if the heat generating member 107-5 and the liquid filling the conduit 113-5 are chemically reactive to affect adversely the heat generating member 107-5 and/or the liquid, or an electric current flows between the selective electrode 105-5 and the common electrode 106 through the liquid filling the conduit 113-5, it is necessary to provide an electrically insulating protective layer or chemically protective layer on at least a portion of the surface of each of the selective electrode 105-5, the common electrode 106 and the heat generating member 107-5 which contacts the liquid filling the conduit 113-5. When such protective layer is provided, the heat generating portion is composed of the heat generating member and the protective layer, and the heating surface contacting the liquid filling the heat actuating portion, $\Delta$ 1, constituting a part of the conduit is the part of the protective layer contacting the heat actuating portion, $\Delta$ 1.

When an electric power higher than a certain level is applied to an electrothermal transducer having a heat generating member 107-5 which has a cross sectional structure as shown in FIG. 1C and a plane structure as shown in FIG. 1D, the temperature of the surface of the heat generating member 107-5 elevates and the ink in the conduit 113-5 is heated to form a bubble 108, and the bubble 108 is formed such that the bubble 108 covers the entire surface of the heat generating member 107-5. Therefore, for the purpose of increasing the volume of bubble 108, there can be used a method that the power supply level, that is, the voltage value or pulse width (power supplying period of time) is increased to elevate the surface temperature of the heat generating member 107-5 resulting in growing the bubble. However, it is not efficient to change the volume of a bubble by varying the height of the bubble from the surface of the heat generating member 107-5, and a sufficient gradation can not produced.

Further, another method is that a plurality of heat generating members and electrodes to conduct a current thereto is provided in a heat actuating portion, $\Delta$ 1, of each conduit and the total heat generating area is regulated by varying selectively the number of driven heat generating members and thereby the volume of the bubble is modulated by increasing or decreasing the area of the bubble generation so as to express gradation. However, according to this method, at least 3 electrodes per one conduit are necessary, and the more precise the recorded gradation, the more the necessary electrodes. Therefore, it is very difficult to adapt such a method for high density multiorifice recording.

The present inventors have found that there is a threshold value of surface temperature of a heat generating portion of an electrothermal transducer for causing an abrupt state change of the liquid by heat energy, and have succeeded in reproducing effectively gradation by using the simplest construction, i.e., a pair of electrodes per one heat generating member, where the surface area of a temperature higher than the threshold value is continuously changed corresponding to the input power level.

According to the liquid jet recording method of the present invention, a recording head is used which includes a heat generating portion of an electrothermal transducer having a structure such that the degree of heat supply is different from position to position on the heating surface and such positional difference of degree of heat supply is utilized to record gradation.

Therefore, no particular scanning is necessary and a recording head structure of a high density multi-orifice type can be actually realized. Moreover, high velocity recording can be effected in the same manner as in the case of ordinary recording without regard for gradation. Furthermore, a gradation of high fidelity to the original one can be recorded, and such recording head can be easily manufactured.

FIG. 2 shows an example of electric signal used in regulating the magnitude of an electric signal driving an electrothermal transducer provided with a heat generating portion which is of such a structure that the degree of heat supply is different from position to position on the heating surface.

In the present invention, the magnitude of the electric signal applied to the electrothermal transducer can be controlled by one of the voltages ($V_1$–$V_5$) and the pulse width ($t_1$–$t_5$) as shown in FIG. 2. For example, the pulse width is fixed to $t_3$ and the voltage is changed from $V_1$ to $V_5$, or the voltage is fixed to $V_3$ and the pulse width is changed from $t_1$ to $t_5$.

When an electric signal is selected from many electric pulse signals of various magnitudes as shown in FIG. 2 corresponding to a gradation image to be recorded and is applied to an electrothermal transducer having a particular structure to drive said transducer, there can be obtained a recorded image of high quality at high speed.

According to the present invention, the recording head has an electrothermal transducer provided with a particular structure of heat generating portion where a particular distribution of degree of heat supplying at the heating surface is formed.

Some embodiments of the heat generating portion are shown in the following.

Figure 3:
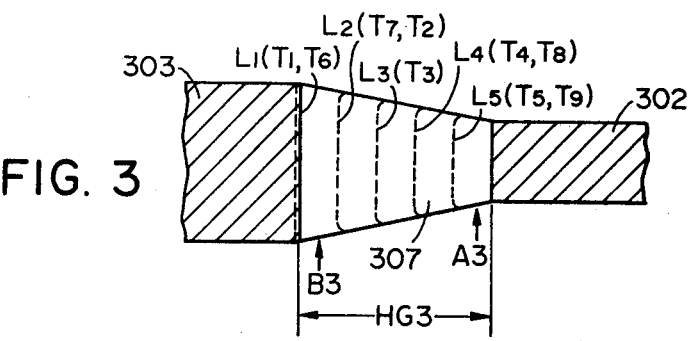
FIG. 3 is a diagrammatic plane view showing a plane pattern of an embodiment of the heat generating portion of the electrothermal transducer according to the present invention.

A first embodiment is shown in FIG. 3. The plane view thereof shows a heat generating portion, HG3, of a trapezoid plane shape and having electrodes 302 and 303 at both ends, respectively. (In this case, it is preferable that the thickness of the layer of heat generating portion HG3 is uniform) and thereby, for example, the current density at portion A is different from that at portion B, and therefore, the quantity of generated heat per unit time at portion A is different from that at portion B.

The cross sectional structure at the heat generating portion 307 is similar to that shown in FIG. 8, and a desired substrate, a heat accumulating layer and a heat generating member are subsequently laminated, and further a protective layer is provided on the heat generating member so as to isolate the heat generating member from the liquid filling the conduit. Both ends of the heat generating member are electrically connected to electrodes 302 and 303 respectively.

Figure 4:
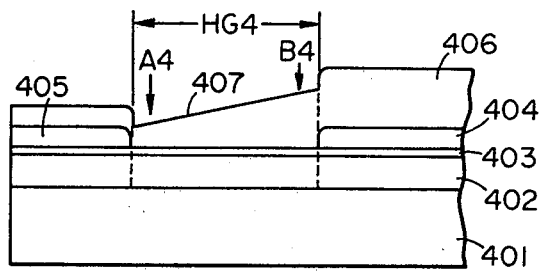
FIGS. 4–7 are diagrammatic cross sectional views of embodiments of the electrothermal transducer according to the present invention.

A second embodiment is shown in FIG. 4, which is a cross sectional view of the structure. The protective layer 406 has a thickness gradient from the side of electrode 404 to the side of electrode 405. Thus there can be produced a positional distribution gradient of the heat quantity supplied to the liquid contacting the surface 407 from the heat surface 407 (a surface of the heat generating portion) per unit time.

In FIG. 4, 401 denoted a substrate, 402 a heat accumulating layer, and 403 a heat generating member. Each of these has a uniform thickness and is of a uniform material so as to make the heat supplying degree gradient between A4-B4 continuous.

Figure 5:
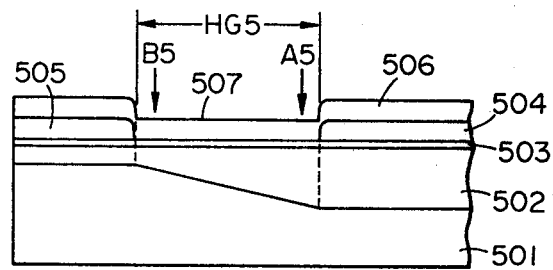

A third embodiment is shown in FIG. 5 which is a cross sectional view. The thickness of a heat accumulating layer 502 in the region of heat generating portion HG5 gradually decreases from A5 to B5 so as to form a gradient of the heat releasing from a heat generating member 503 to a substrate 501. Thus there is produced a positional gradient of the heat supplying quantity per unit time to the liquid contacting the surface of the heat generating portion HG5.

In FIG. 5, reference numerals 501, 503, 504, 505, 506 and 507 represent substrate, heat generating member, one electrode, the other electrode, protective film and heating surface.

Figure 6:
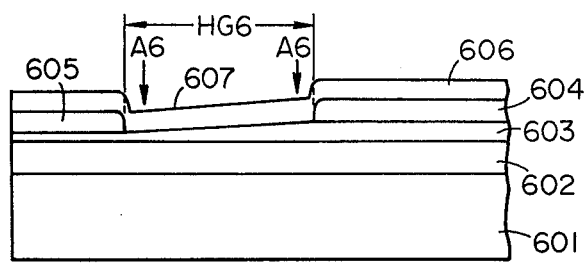

A fourth embodiment is shown in FIG. 6 which is a cross sectional view. The thickness of a heat generating member 603 has a gradient in the heat generating portion HG6 and the heat generating member 603 is provided on a heat accumulating layer 602. The electrical resistance differs from the positions A6 to B6 and thereby the heat quantity generated at each position of the heat generating portion HG6 per unit time can be controlled by utilizing this difference of resistance. That is, the thickness of the heat generating member 603 in the region of heat generating portion HG6 continuously decreases from one end at the electrode 604 side to the other end at the electrode 605 side and therefore there is formed a positional variation of current density. As the result, heat quantity generated at each position ranging from A6 to B6 per unit time can be controlled and there is formed a positional surface temperature distribution at the heat generating portion HG6.

Figure 7:
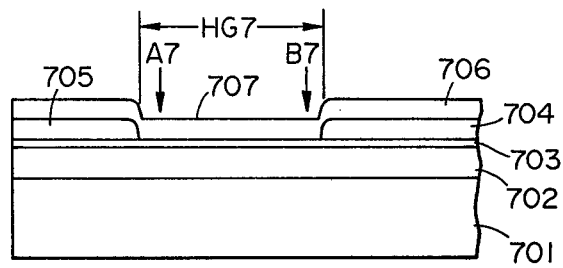

A fifth embodiment is shown in FIG. 7 which is a cross sectional view. Each constitution part has a uniform thickness, but the specific resistance of a heat generating member 703 at a heat generating portion HG7 has a positional variation in the region of A7-B7. Thus, the heat quantity generated in the region of A7-B7 of the heat generating portion HG7 per unit time can be continuously positionally changed. In FIG. 7, 701 denotes a substrate, 702 a heat accumulating layer, 704 and 705 electrodes, and 706 a protective film.

In view of the foregoing, according to the present invention, there may be various structures and characteristics of an electrothermal transducer capable of making the present invention. In summary, it is an important feature of the present invention that the heat quantity per unit time supplied to the liquid contacting the surface of the heat generating portion HG of a electrothermal transducer, i.e. a heating surface such as that indicated by reference numerals 307, 407, 507, 607 and 707, has a positional gradient between the electrodes, and thereby the position where the abrupt state change occurs and the manner in which said state change occurs can be controlled resulting in the volume of the liquid droplet ejected from the ejecting orifice being varied and the gradation recording being achieved.

Referring to FIG. 3, the effect and function of the present invention will be explained below.

The broken lines are isothermal lines $L_1$–$L_5$ indicating a threshold temperature $T_0$ for forming a bubble by the abrupt state change with respect to the following power levels: $T_1(t_1,V_3)$, $T_2(t_2,V_3)$, $T_3(t_3,V_3)$, $T_4(t_4,V_3)$, $T_5(t_5,V_3)$, $T_6(t_3,V_1)$, $T_7(t_3,V_2)$, $T_8(t_3,V_4)$ and $T_9(t_3,V_5)$. The sizes of a bubble formed in such cases are shown as $b_1$–$b_5$ in FIG. 8. $T_1$ and $T_6$, $T_2$ and $T_7$, and $T_4$ and $T_9$ give the same power levels though the time or the voltage level is different. Therefore, their isothermal lines are the same lines.

For example, to the heat generating member 301 (FIG. 8) is applied the power level $T_5$ or $T_9$ giving the isothermal line $L_1(T_5, T_9)$ through electrodes 302 and 303, and thus a bubble having the size of $b_5$ is formed on the heating surface 307 (the surface of the heat generating portion HG3) and a force caused by the formation of this bubble actuates to eject a liquid droplet of a volume proportional to the magnitude of the force from the orifice.

When the power level $T_3$ giving the isothermal line $L_3$ is applied to the heat generating member 301, a bubble of the size of $b_3$ is formed on the heating surface 307, and a liquid droplet is ejected from the orifice in a way similar to above.

FIGS. 9–13 show further embodiments of an electrothermal transducer used in the present invention. In these embodiments, there are given a gradient of electric current density by, for example, modifying the planar shape of the heat generating portion, a plane shape of the electrode, or the connection between the heat generating member and the electrode.

Figure 9:
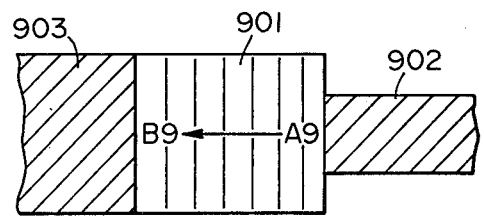
FIGS. 9–13 diagrammatically show plane views of various modifications of the plane pattern of the heat generating portion of the electrothermal transducer according to the present invention.

Referring to FIG. 9, the planar shape of a heat generating portion 901 is rectangular, and the connecting portion between an electrode 902 and a heat generating portion 901 is smaller than that between an electrode 903 and the heat generating portion.

Figure 10:
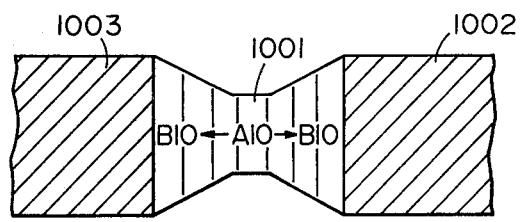
Figure 11:
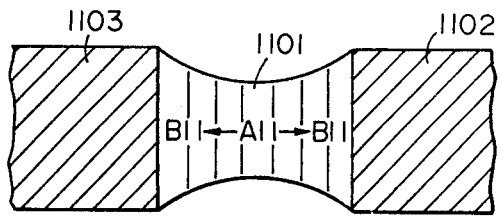

Referring to FIGS. 10 and 11, the center portion of a heat generating portion 1001 or 1101 is of a planar shape narrower than both ends.

Figure 12:
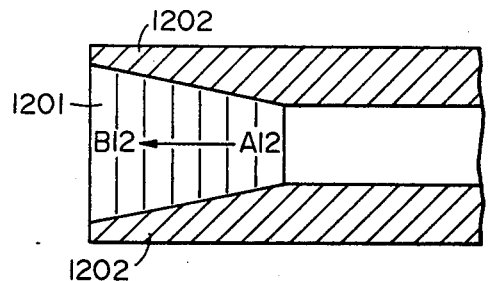

Referring to FIG. 12, the plane shape of a heat generating portion 1201 is trapezoid and electrodes 1202 and 1203 are connected to the sides of the trapezoid which are not proportional to each other.

Figure 13:
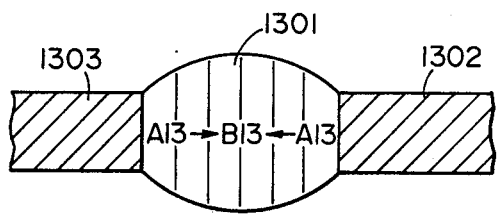

Referring to FIG. 13, the plane shape of the center portion of a heat generating portion 1301 is broader than that of each of the both ends.

In FIGS. 9–13, there is formed a negative gradient of electric current density in the direction from A to B in the heat generating portion. Thus, by changing the input power level the abrupt state change occurring in the heat actuating portion can be controlled resulting in determining the volume of the ejected droplet and recording gradation.

The present invention is completely different from a conventional method of recording gradation by modulating the number of liquid droplets projected per one segment of image utilizing a particular scanning procedure. According to the present invention, the volume of the ejected liquid droplet is modulated corresponding to the gradation of the original image to record the gradation. Therefore, the recording head itself can be formed such that orifices are arrayed at a high density to produce a multi-orifice system. As a result, for example, it is possible to arrange the orifices at the same density as that of the resolution of the recorded image and the gradation can be recorded easily at a high speed.

The invention is further illustrated by the following examples.

EXAMPLE 1

Figure 8:
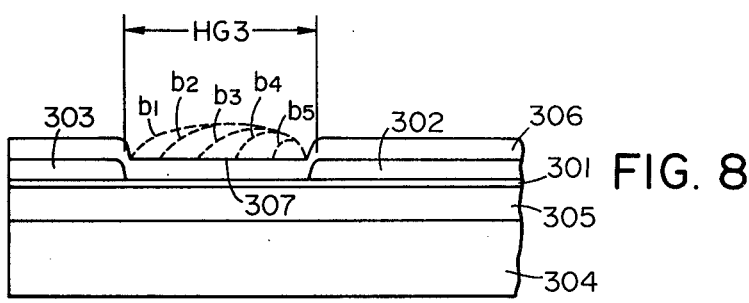
FIG. 8 is a diagrammatic cross sectional view of the heat generating portion of the electrothermal transducer having the plane pattern of FIG. 3 and shows diagrammatically the formation of bubbles depending upon the applied electric power.

A multi-orifice ink jet recording head as shown in FIGS. 1A and 1B except that the electrothermal transducer portion had the structure and shape as shown in FIG. 3 and FIG. 8 was manufactured as shown below, and there was obtained a record of good gradation by using the resulting recording head.

On an alumina substrate 304 of 3 mm × 10 mm in size and 0.5 mm in thickness was formed a heat accumulating layer 305 of $SiO_2$ 4 microns thick by sputtering. Then a heat generating member 301 of $HfB_2$ 2000 Å thick was formed by sputtering, and electrodes 302 and 303 Al of 5000 Å thick was formed by vapor-deposition. Selective etching is conducted to form a pattern as shown in FIG. 3. The resulting trapezoid of the heat generating member has an upper side 30 microns long, a lower side 50 microns long and a height of 300 microns long. After the patterning, a protecting film 306 was formed by depositing $Si_3N_4$ in the thickness of 1.0 micron by a gas phase reaction of $SiH_4$ and $NH_3$. The heat generating portion 307 was bonded to a grooved plate 102 having 6 grooves of 50 microns × 50 microns in cross section and 250 microns in pitch in such a way that the heat generating portion 307 corresponds to the groove. The orifice was present on the left side of the pattern in FIG. 3 and the distance between the orifice and the left end of the heating surface 307 was 500 microns. Resistance of the heat generating portion 301 was 100 ohm.

Figure 14:
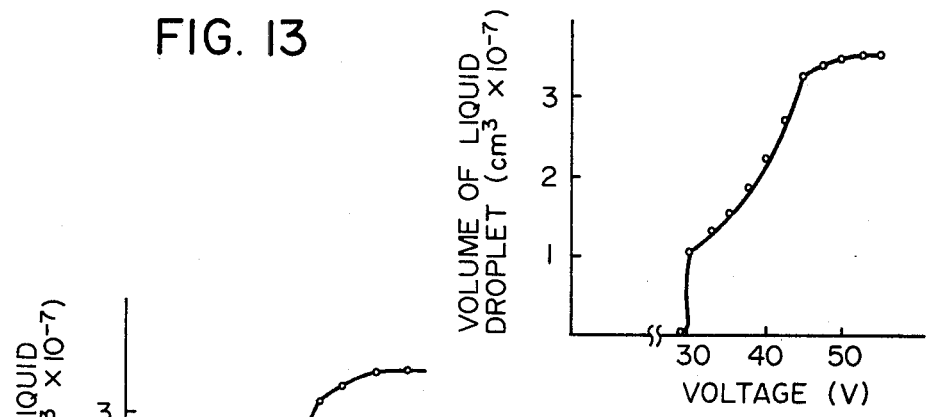
FIG. 14 is the graph showing a relation between a voltage of input signal applied to an electrothermal transducer and the volume of the ejected liquid droplet.
Figure 15:
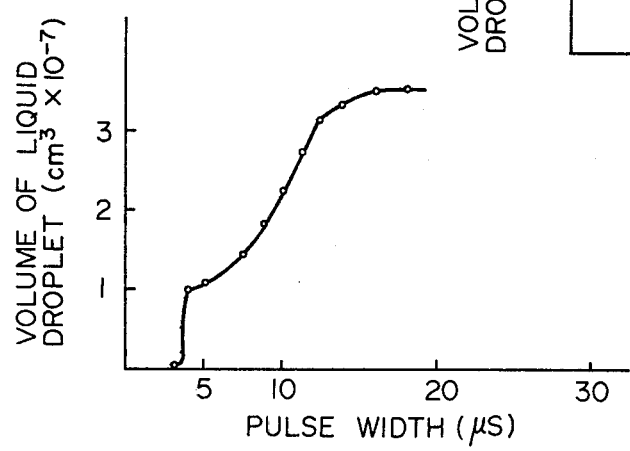
FIG. 15 is the graph showing a relation between a pulse width of a signal applied to an electrothermal transducer and the volume of the ejected liquid droplet.

To the recording head thus produced a rectangular voltage of 10 μsec was supplied at a cycle of 200 μsec, and when 30 V of voltage was applied, a liquid droplet was ejected for the first time. When the input voltage was raised up to 45 V, the volume of the ejected liquid droplet increased continuously. The result is shown in FIG. 14. The volume of the liquid droplet was saturated at 45 V or higher. This appears to be attributable to the formation of a bubble over the entire surface area of the heat generating portion. To the same recording head was applied a voltage pulse of 40 V with a pulse width of 1-20 μsec. The volume of the ejected liquid droplet varied in the same manner as above and there was obtained a record of a good gradation. The result is shown in FIG. 15.

The ink was composed of water as the main solvent and a black dye.

EXAMPLE 2

A recording head was producing having an electrothermal transducer of FIG. 1A and 1B except that the plane pattern was that in FIG. 1D and the cross sectional view of the head was that in FIG. 4 as shown below.

Following the procedures of Example 1 up to forming Al electrodes 404 and 405, a selective etching was effected to produce a pattern heat generating portion of 40 microns wide and 300 microns long with a pitch of 250 microns. As a protecting film 406, an $SiO_2$ layer was formed by sputtering, and upon this sputtering a mask about 2 mm thick was placed near the heat generating member 403 at a distance of about 1 mm from the heat generating member 403 for shadowing, and thus a tapered protecting film having a thickness changing from one end was formed to the other end. The thickness of the protecting film 406 was 1.0 micron at the thinnest and 3 microns at the thickest. When the voltage was changed in the range of from 30 V to 50 V at a pulse width of 10 μsec as in Example 1, the volume of the liquid droplet changed corresponding to the input voltage at a high fidelity and a record having gradation was obtained.

EXAMPLE 3

Each multi-orifice recording head as illustrated in FIGS. 1A and 1B having six conduits except that the electrothermal transducer portion had a cross sectional view of FIG. 5 or FIG. 6 was manufactured and a gradation recording was effected as in Example 1. There was produced an image of high gradation and high quality in each case.

Each multi-orifice recording head having six conduits as illustrated in FIGS. 1A and 1B except that the electrothermal transducer portion had a cross sectional view of FIG. 8 and a heat generating portion of planar pattern of each of FIGS. 9-13 was prepared and gradation recording was effected. The result in each case was almost the same as above.

What we claim is:

1. A liquid jet recording method capable of recording gradation which comprises:
   (a) filling a conduit with a liquid, said conduit having, at one end, an orifice for ejecting and projecting a liquid droplet in a predetermined direction, said conduit being provided with a heat actuating portion for generating a force for ejecting the liquid droplet by applying heat energy to the liquid to cause an abrupt state change, wherein the heat actuating portion includes an electrothermal transducer having a heat generating portion of such a structure that the degree of heat supply is different from position to position on the heating surface, and
   (b) controlling the strength of an input electric signal corresponding to the gradation of an image to be recorded, thereby controlling the distribution of the degree of heat supply at the heating surface.

2. The method according to claim 1 in which the heat generating portion is mounted on a substrate in the form of a layer which positionally has a gradient in thickness.

3. The method according to claim 1 in which the heat generating portion has a heat generating member and an electrode connected to each of the ends of the heat generating member.

4. The method according to claim 3 in which the thickness of the heat generating member has a positional gradient.

5. The method according to claim 3 in which the heat generating member has a planar shape which provides a positional variation of electric current density between the electrodes.

6. The method according to claim 1 in which the heat generating portion includes a heat generating member formed on a substrate, two electrodes each of which is connected to one end of the heat generating member, and a protecting layer protecting the heat generating member and the two electrodes.

7. The method according to claim 6 in which the protecting layer has a positional gradient of thickness at least at a region the protecting layer covers the heat generating member.

8. The method according to claim 6 in which a heat accumulating layer is present between the substrate and the heat generating member.

9. The method according to claim 8 in which the heat accumulating layer has a positional gradient of thickness at least at a region where the heat generating member is provided.

* * * * *